(12) United States Patent
Umeda

(10) Patent No.: US 11,625,570 B2
(45) Date of Patent: Apr. 11, 2023

(54) COMPUTER-READABLE RECORDING MEDIUM, DETERMINATION METHOD, AND DETERMINATION APPARATUS FOR CLASSIFYING TIME SERIES DATA

(71) Applicant: FUJITSU LIMITED, Kawasaki (JP)

(72) Inventor: Yuhei Umeda, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 849 days.

(21) Appl. No.: 16/202,577

(22) Filed: Nov. 28, 2018

(65) Prior Publication Data

US 2019/0180166 A1      Jun. 13, 2019

(30) Foreign Application Priority Data

Dec. 8, 2017   (JP) .............. JP2017-236369

(51) Int. Cl.
  *G06N 3/08*  (2023.01)
  *G06N 3/04*  (2023.01)
(52) U.S. Cl.
  CPC .............. *G06N 3/04* (2013.01); *G06N 3/08* (2013.01)
(58) Field of Classification Search
  CPC .................... G06N 3/04; G06N 3/08
  See application file for complete search history.

(56) References Cited

U.S. PATENT DOCUMENTS

2007/0036434 A1* 2/2007 Saveliev .............. G06K 9/52
                                                           382/173
2016/0140438 A1* 5/2016 Yang .................... G06N 3/08
                                                           706/12
2017/0147946 A1   5/2017 Umeda
2018/0000371 A1* 1/2018 Gupta .................. A61B 5/316
2018/0082178 A1* 3/2018 Nakamura ........... G06N 3/0454
2018/0144466 A1* 5/2018 Hsieh .................... G06N 3/04
2019/0005358 A1* 1/2019 Pisoni .................... G06N 3/08

FOREIGN PATENT DOCUMENTS

JP    2016-42123        3/2016
JP    2016-95434        5/2016
JP    2017-097643 A     6/2017

OTHER PUBLICATIONS

Berwald et. al., "Automatic recognition and tagging of topologically different regimes in dynamical systems", Mar. 24, 2014 (Year: 2014).*

(Continued)

*Primary Examiner* — Omar F Fernandez Rivas
*Assistant Examiner* — Selene A. Haedi
(74) *Attorney, Agent, or Firm* — Xsensus LLP

(57) ABSTRACT

A determination apparatus generates an interval vector having a plurality of components that are adjacent occurrence intervals between a plurality of events that have occurred in chronological order. The determination apparatus generates a plurality of local variable points each of which includes specific components as one set of coordinates, using a predetermined number of consecutive interval vectors in the chronological order. The determination apparatus generates a Betti sequence by applying persistent homology transform to the plurality of local variable points for which the interval vectors serving as starting points are different. The determination apparatus determines a type of the plurality of events based on the Betti sequence.

7 Claims, 9 Drawing Sheets

(56) References Cited

OTHER PUBLICATIONS

Eberlein et. al., "Report: Graph Theory and Quantum Statistical Mechanics", Jun. 2017 (Year: 2017).*
Gang et. al., "Analysis and Prediction of Protein Folding Energy Changes Upon Mutation by Element Specific Persistent Homology", Nov. 2017 with advanced access available in Jul. 2017 (Year: 2017).*
Han et al., "Deep Residual Learning for Compressed Sensing CT Reconstruction via Persistent Homology Analysis", 2016 (Year: 2016).*
Qaiser et. al., "Persistent Homology for FastTumor Segmentation in Whole Slide Histology Images", 2016 (Year: 2016).*
Hofer et. al. "Deep Learning with Topological Signatures", Nov. 2017 (Year: 2017).*
Bianchini et. al., "On the Complexity of Neural Network Classifiers: A Comparison Between Shallow and Deep Architectures", 2014 (Year: 2014).*

\* cited by examiner

POINT PROCESS DATA

RADIUS: 0

RADIUS: $r_1$

RADIUS: $r_2$

RADIUS: $r_3$

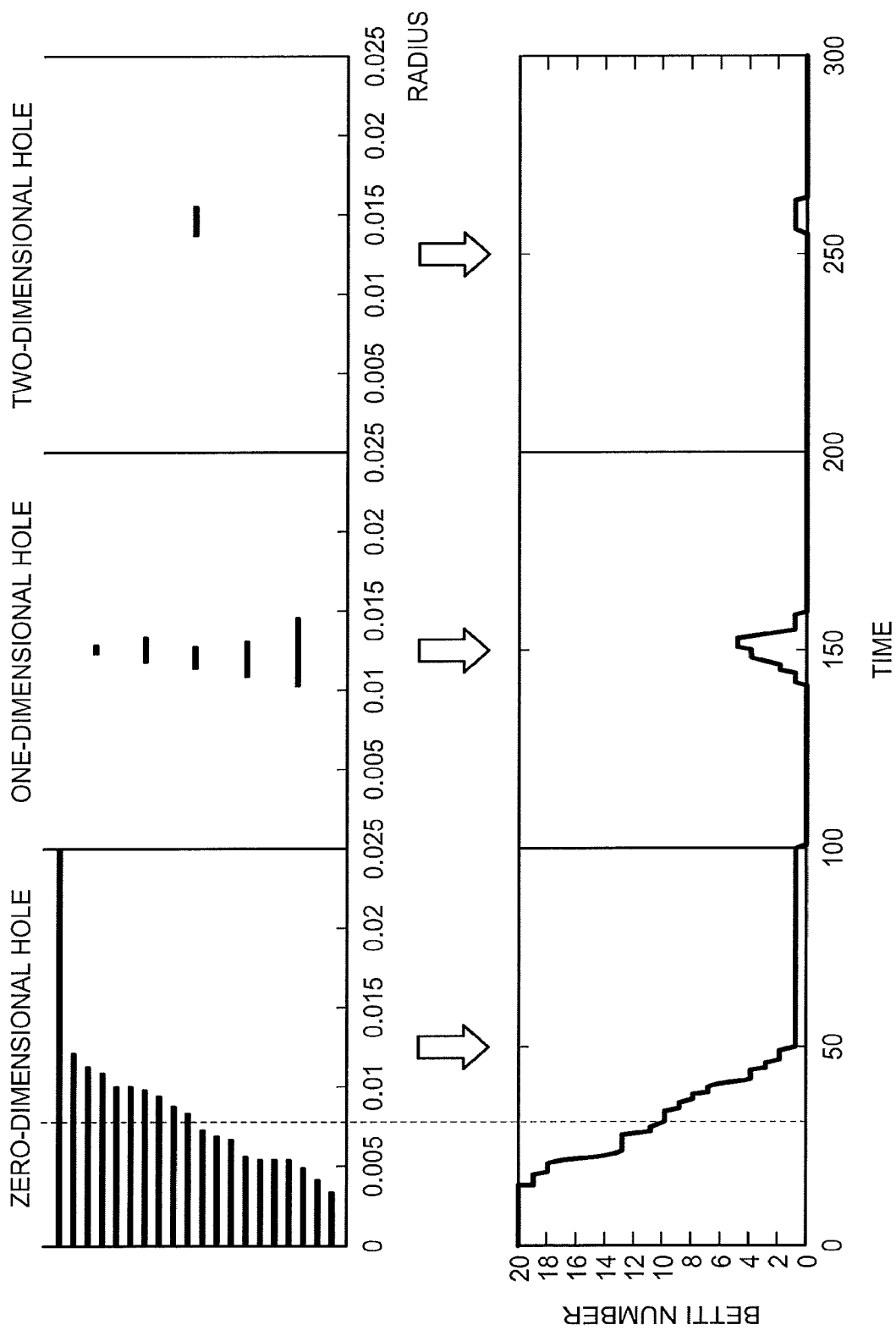

FIG.9

OVERALL PERCENTAGE OF CORRECT ANSWERS

|  | FIRST GENERAL METHOD | SECOND GENERAL METHOD | THIRD GENERAL METHOD | FIRST EMBODIMENT |
|---|---|---|---|---|
| ACCURACY | 27% | 72.5% | 72.2% | 95% |

PERCENTAGE OF CORRECT ANSWERS FOR EACH COMPONENT

|  | FIRST GENERAL METHOD | SECOND GENERAL METHOD | THIRD GENERAL METHOD | FIRST EMBODIMENT |
|---|---|---|---|---|
| LABEL 1 | 26% | 100% | 54% | 85% |
| LABEL 2 | 25% | 90% | 45% | 95% |
| LABEL 3 | 28% | 100% | 95% | 100% |
| LABEL 4 | 29% | 0% | 95% | 100% |

FIG.10

■FIRST GENERAL METHOD

| | ESTIMATED LABEL | | | |
|---|---|---|---|---|
| | LABEL 1 | LABEL 2 | LABEL 3 | LABEL 4 |
| LABEL 1 | 28% | 24% | 26% | 22% |
| LABEL 2 | 27% | 25% | 22% | 26% |
| LABEL 3 | 21% | 23% | 28% | 28% |
| LABEL 4 | 22% | 21% | 28% | 29% |

(CORRECT LABEL)

■SECOND GENERAL METHOD

| | ESTIMATED LABEL | | | |
|---|---|---|---|---|
| | LABEL 1 | LABEL 2 | LABEL 3 | LABEL 4 |
| LABEL 1 | 100% | 0% | 0% | 0% |
| LABEL 2 | 0% | 90% | 10% | 0% |
| LABEL 3 | 0% | 0% | 100% | 0% |
| LABEL 4 | 0% | 0% | 100% | 0% |

(CORRECT LABEL)

■THIRD GENERAL METHOD

| | ESTIMATED LABEL | | | |
|---|---|---|---|---|
| | LABEL 1 | LABEL 2 | LABEL 3 | LABEL 4 |
| LABEL 1 | 54% | 46% | 0% | 0% |
| LABEL 2 | 55% | 45% | 0% | 0% |
| LABEL 3 | 0% | 5% | 95% | 0% |
| LABEL 4 | 0% | 0% | 5% | 95% |

(CORRECT LABEL)

■FIRST EMBODIMENT

| | ESTIMATED LABEL | | | |
|---|---|---|---|---|
| | LABEL 1 | LABEL 2 | LABEL 3 | LABEL 4 |
| LABEL 1 | 85% | 0% | 8% | 7% |
| LABEL 2 | 0% | 95% | 0% | 5% |
| LABEL 3 | 0% | 0% | 100% | 0% |
| LABEL 4 | 0% | 0% | 0% | 100% |

(CORRECT LABEL)

US 11,625,570 B2

COMPUTER-READABLE RECORDING MEDIUM, DETERMINATION METHOD, AND DETERMINATION APPARATUS FOR CLASSIFYING TIME SERIES DATA

CROSS-REFERENCE TO RELATED APPLICATION

This application is based upon and claims the benefit of priority of the prior Japanese Patent Application No. 2017-236369, filed on Dec. 8, 2017, the entire contents of which are incorporated herein by reference.

FIELD

The embodiments discussed herein are related to a computer-readable recording medium storing a determination program, a determination method, and a determination apparatus.

BACKGROUND

A deep learning (DL) technology for automatically classifying time series data has been known. The time series data includes what is called point process time series data that has the characteristic that events occur intermittently and times when the events occur are not predictable. Examples of the point process time series data include heart-rate data, Internet access by customers or the like, product demand data, economic transactions, and earthquake data. Because the point process time series data is the time series data, it is desired to classify the data, such as classifying the heart-rate data according to presence and absence of disease or according to degree of sleepiness or classifying an economic index according to economic status, for example.

In recent years, as a technology related to analysis of the point process time series data, there is a known technology in which intervals between events are adopted as values at the times of occurrence, the interval values are interpolated and converted into time series data, frequency analysis is subsequently performed, and features of the occurrence intervals are extracted. As other technologies, there is a known technology in which occurrence of events is modeled by a Poisson process or the like and the occurrence of events is handled as stochastic data, and there is another known technology in which it is assumed that the occurrence of events is chaotic and a feature amount of chaotic time series is obtained.

Patent Document 1: Japanese Laid-open Patent Publication No. 2016-95434

Patent Document 2: Japanese Laid-open Patent Publication No. 2016-42123

In the technologies as described above, a parameter is obtained based on the assumption that point process time series data to be analyzed corresponds to a specific model; however, it is difficult to determine whether the point process time series data to be analyzed corresponds to the specific model from a parameter value itself. In particular, when calculation is performed as chaotic time series, even if the same point process time series is used, a completely different parameter may be output due to a difference in an initial value, for example.

In this manner, in the technologies as described above, determination of the point process time series data has a problem in that it may be requested to modify information by interpolation or it may be requested to find out, in advance, that event occurrence intervals correspond to a specific model; thus, it is practically difficult to perform the determination.

SUMMARY

According to an aspect of an embodiment, a non-transitory computer-readable recording medium stores therein a determination program that causes a computer to execute a process. The process includes first generating an interval vector having a plurality of components that are adjacent occurrence intervals between a plurality of events that have occurred in chronological order; second generating a plurality of local variable points each of which includes specific components as one set of coordinates, using a predetermined number of consecutive interval vectors in the chronological order; third generating a Betti sequence by applying persistent homology transform to the plurality of local variable points for which the interval vectors serving as starting points are different; and determining a type of the plurality of events based on the Betti sequence.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 7 is a diagram for explaining a relationship between barcode data and generated continuous data;

FIG. 9 is a diagram for explaining an experimental result;

FIG. 10 is a diagram for explaining details of the experimental result; and

DESCRIPTION OF EMBODIMENTS

Preferred embodiments will be explained with reference to accompanying drawings. The present invention is not limited by the embodiments below. In addition, the embodiments may be combined appropriately as long as no contradiction is derived.

[a] First Embodiment

Overall Configuration

Figure 1:
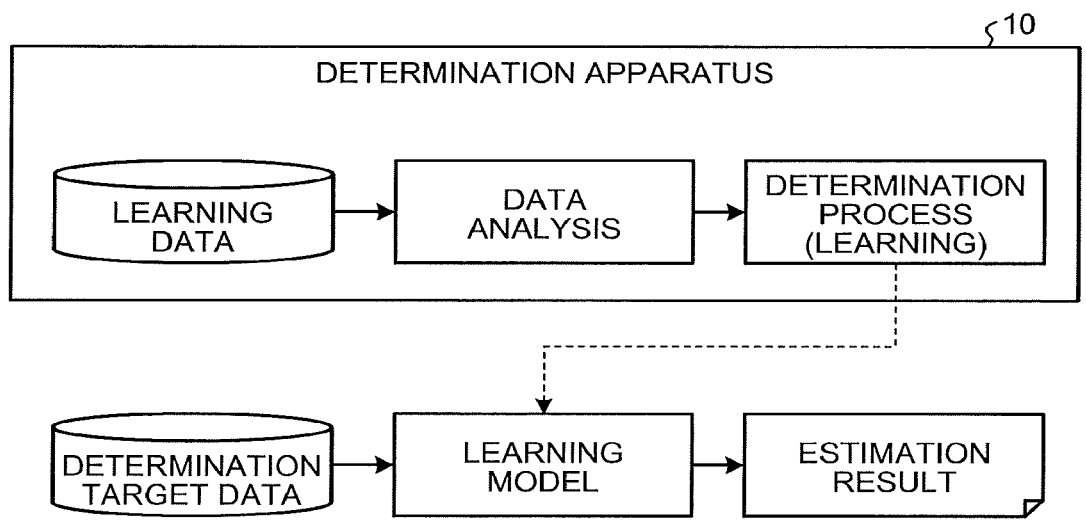
FIG. 1 is a diagram for explaining an example of an entire determination apparatus according to a first embodiment.

FIG. 1 is a diagram for explaining an example of an entire determination apparatus according to a first embodiment. As illustrated in FIG. 1, a determination apparatus 10 according to the first embodiment performs data analysis on learning data, subsequently performs a determination process (learning process) using machine learning, deep learning (DL), or the like, and learns a neural network (NN) or the like so that the learning data can be accurately determined (classified) for each event. Thereafter, by using a learning model to which a learning result is applied, an event (label) of determination target data is estimated with accuracy.

Learning data assumed in the first embodiment described herein is, for example, point process time series data, such as heart-rate data or economic transactions, in which events occur intermittently. This learning data is data for which what kind of model corresponds to occurrence intervals is not indicated in advance, and whether the occurrence intervals are chaotic (meet a nonlinear rule) is not indicated in advance. In other words, the learning data is data that can hardly be distinguished using a conventional learning method.

In the state as described above, the determination apparatus 10 generates, from learning data, an interval vector that contains, as a plurality of components, adjacent event occurrence intervals between events that have occurred in chronological order. Subsequently, the determination apparatus 10 generates local variable points each of which contains specific components as one set of coordinates, from a predetermined number of consecutive interval vectors in chronological order. Then, the determination apparatus 10 generates a Betti sequence by applying persistent homology transform to a plurality of local variable points for which the interval vectors serving as starting points are different, and determines a type of an event of the learning data based on the Betti sequence.

In other words, the determination apparatus 10 generates an interval vector in which the event occurrence intervals are arranged, generates an attractor from the interval vector, performs persistent homology transform from the attractor, and generates a feature amount. Then, the determination apparatus 10 generates a feature amount of the learning data, and determines (classifies) an event from the point process time series data based on the feature amount, so that it is possible to determine the event without any preconditions related to models. Meanwhile, the determination apparatus 10 is one example of a computer apparatus, such as a server, a personal computer, or a tablet. Further, the determination apparatus 10 and an apparatus that executes an estimation process using a learning model may be realized by separate apparatuses or may be realized by a single apparatus.

Functional Configuration

Figure 2:
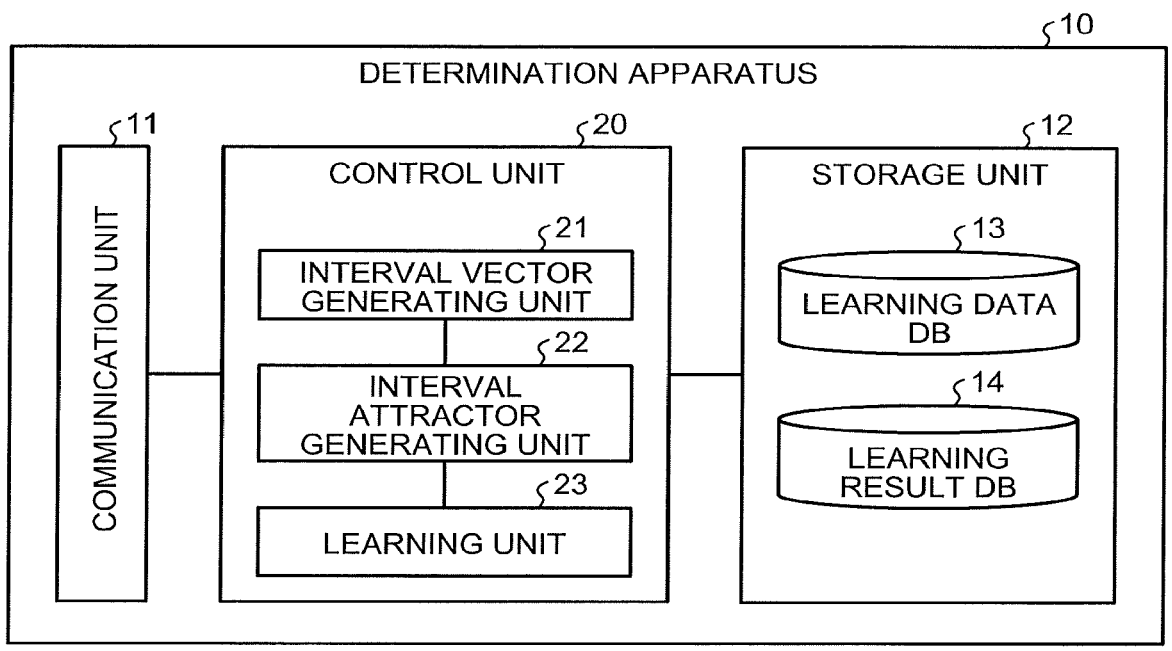
FIG. 2 is a functional block diagram illustrating a functional configuration of the determination apparatus according to the first embodiment.

FIG. 2 is a functional block diagram illustrating a functional configuration of the determination apparatus 10 according to the first embodiment. As illustrated in FIG. 2, the determination apparatus 10 includes a communication unit 11, a storage unit 12, and a control unit 20.

The communication unit 11 is a processing unit that controls communication with other apparatuses, and is, for example, a communication interface. For example, the communication unit 11 receives a process start instruction from a terminal of an administrator. Further, the communication unit 11 receives learning data (input data) from the terminal of the administrator or the like, and stores the learning data in a learning data database (DB) 13.

The storage unit 12 is one example of a storage device that stores therein a program and data, and is, for example, a memory, a hard disk, or the like. The storage unit 12 stores therein the learning data DB 13 and a learning result DB 14.

Figure 3:
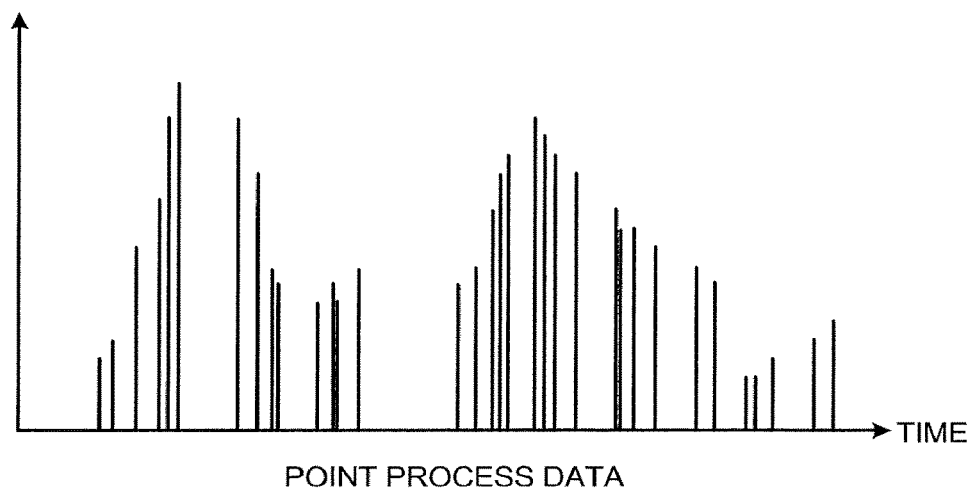
FIG. 3 is a diagram illustrating an example of point process time series data.

The learning data DB 13 is a database for storing data to be learned. Specifically, the learning data DB 13 stores therein data in point process time series (hereinafter, may be described as point process time series data). FIG. 3 is a diagram illustrating an example of the point process time series data. As illustrated in FIG. 3, the point process time series data is data in which events occur intermittently, and is, for example, heart-rate data, earthquake data, or the like. In FIG. 3, the horizontal axis represents time, and the vertical axis represents a magnitude (value) of an event.

The learning result DB 14 is a database for storing a learning result. For example, the learning result DB 14 stores therein a determination result (classification result) of the learning data obtained by the control unit 20, and various parameters learned by machine learning or deep learning.

The control unit 20 is a processing unit that controls the entire process of the determination apparatus 10, and is, for example, a processor or the like. The control unit 20 includes an interval vector generating unit 21, an interval attractor generating unit 22, and a learning unit 23. The interval vector generating unit 21, the interval attractor generating unit 22, the learning unit 23 are examples of processes that are executed by an electronic circuit included in the processor, the processor, or the like. In addition, the interval vector generating unit 21 is one example of a first generating unit, the interval attractor generating unit 22 is one example of a second generating unit and a third generating unit, and the learning unit 23 is one example of a determining unit.

The interval vector generating unit 21 is a processing unit that generates an interval vector that contains, as a plurality of components, adjacent occurrence intervals between a plurality of events that have occurred in chronological order. For example, the interval vector generating unit 21 is able to process "a plurality of events" in a certain interval, such as a time interval, that is separated under a specific condition. More specifically, the interval vector generating unit 21 aligns pieces of data to be determined (classified/recognized) at the same length with reference to a time axis, for each piece of point process time series data. Then, the interval vector generating unit 21 generates a vector, in which event occurrence intervals are arranged in sequence, with respect to a part of each piece of the point process time series data aligned at the same length (hereinafter, may be described as small point process time series data). In this case, a length of the interval vector generated for each piece of the small point process time series data is different.

Figure 4:
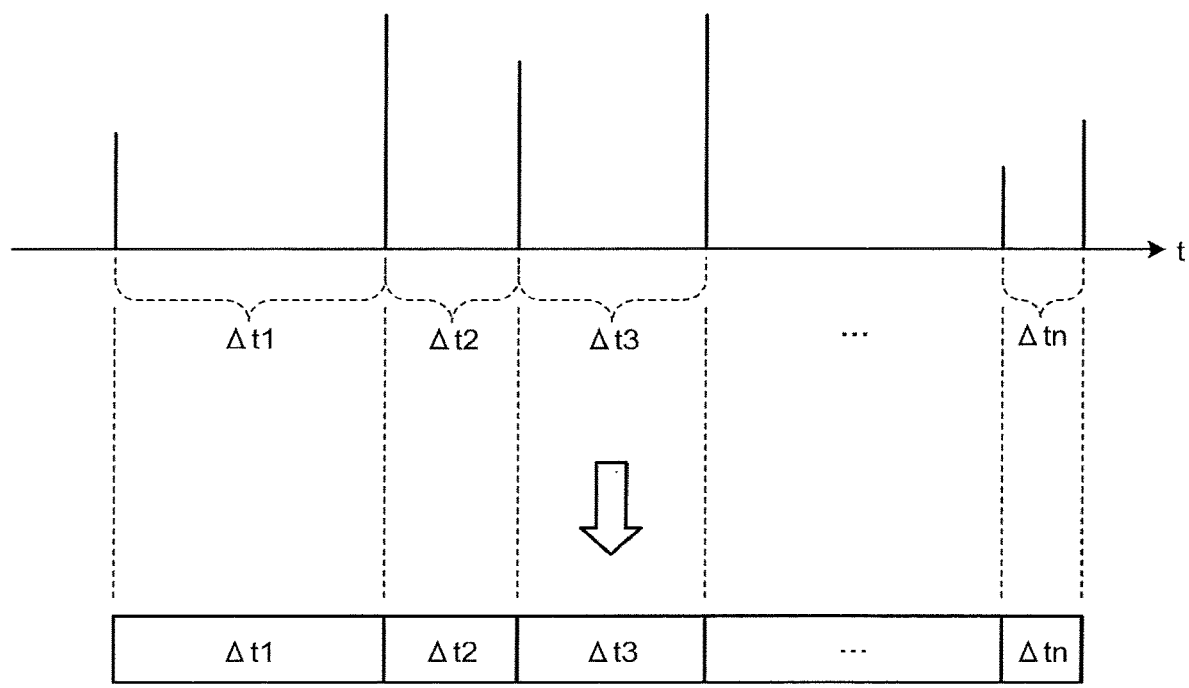
FIG. 4 is a diagram for explaining an example of generation of an interval vector.

FIG. 4 is a diagram for explaining an example of generation of the interval vector. First, the interval vector generating unit 21 reads the point process time series data from the learning data DB 13, and extracts pieces of small point process time series data at intervals of one minute, for example. Subsequently, as illustrated in FIG. 4, the interval vector generating unit 21 refers to the small point process time series data from the first to the end of the data, and calculates $\Delta t1, \Delta t2, \Delta t3, \ldots, \Delta tn$ as event occurrence intervals. Thereafter, the interval vector generating unit 21 generates an interval vector, in which the event occurrence intervals ($\Delta t1, \Delta t2, \Delta t3, \ldots, \Delta tn$) are arranged in order of occurrence. The interval vector generating unit 21 performs the above-described process on each piece of the small point process time series data.

The interval attractor generating unit 22 is a processing unit that generates local variable points each of which contains specific components as one set of coordinates, from the interval vector generated by the interval vector generating unit 21. Specifically, the interval attractor generating unit 22 uses a point that contains a designated number of adjacent values as coordinates from each interval vector, and generates an interval attractor by collecting a plurality of points by sliding an acquisition range. Meanwhile, the designated number of adjacent values (dimensions of coordinates) may be determined arbitrarily.

Figure 5:
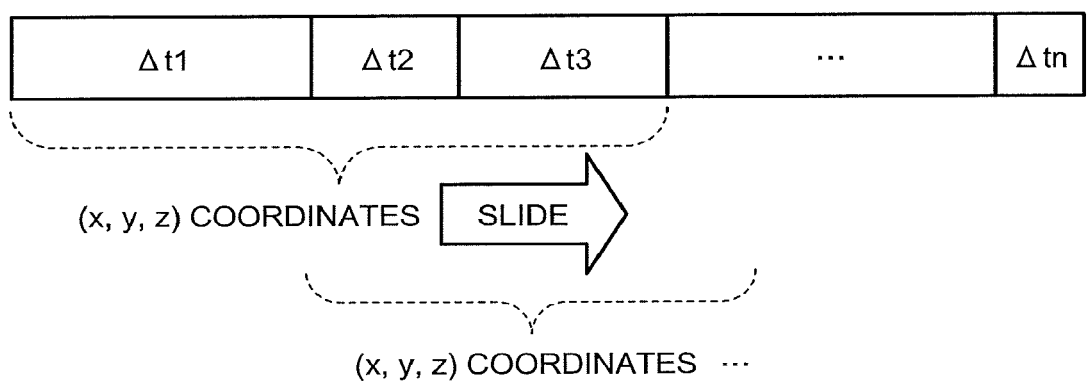
FIG. 5 is a diagram for explaining an example of generation of an interval attractor.
Figure 6A:
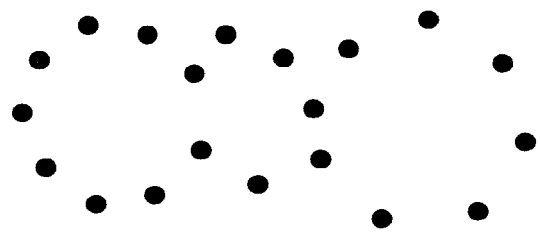
FIGS. 6A to 6D are diagrams for explaining persistent homology.
Figure 6B:
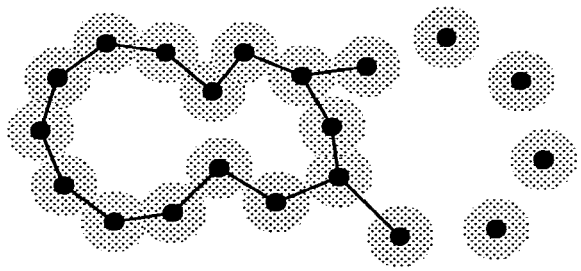
Figure 6C:
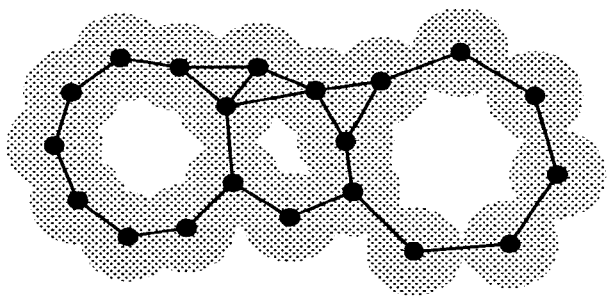
Figure 6D:
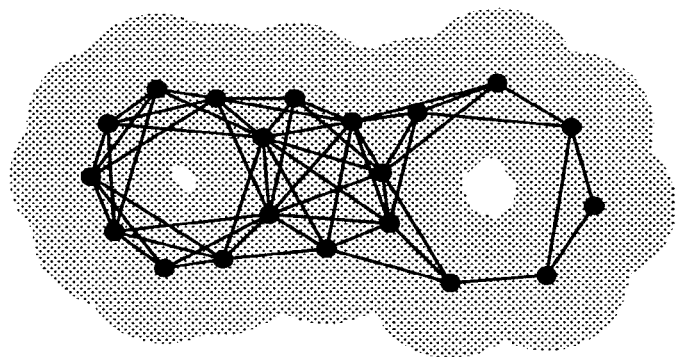

FIG. 5 is a diagram for explaining an example of generation of the interval attractor. As illustrated in FIG. 5, the interval attractor generating unit 22 extracts "Δt1, Δt2, Δt3", as "x, y, z" coordinates and subsequently extracts "Δt2, Δt3, Δt4" as "x, y, z" coordinates from the event occurrence intervals (Δt1, Δt2, Δt3 . . . Δtn) that are the elements of the interval vector. In this manner, the interval attractor generating unit 22 generates the coordinates by sliding the elements (components) of the interval vector. In this example, it may be possible to slide the elements until it becomes impossible to obtain three-dimensional elements, or it may be possible to repeatedly slide the elements until the last occurrence interval corresponds to the x coordinate (in this case, the y coordinate and the z coordinate are zero).

The learning unit 23 is a processing unit that generates a Betti sequence by applying persistent homology transform to a plurality of local variable points for which the interval vectors serving as starting points are different, and determines a type of the plurality of events based on the Betti sequence. Specifically, the learning unit 23 generates a quasi-attractor from each of the interval attractors generated from the small point process time series data, with respect to each piece of the point process time series data, and transforms the internal attractor to a Betti sequence by using persistent homology transform. Then, the learning unit 23 learns the Betti sequence as a feature amount of each piece of the point process time series data, and stores a learning result in the learning result DB 14. Meanwhile, the attractor generated at this time is a set of a finite number of points, and therefore referred to as the "quasi-attractor".

For example, the learning unit 23 may adopt a learning method described in Japanese Laid-open Patent Publication No. 2017-97643. A technique described in Japanese Laid-open Patent Publication No. 2017-97643 will be briefly described below with reference to FIGS. 6A to 6D and FIG. 7. FIGS. 6A to 6D are diagrams for explaining persistent homology. FIG. 7 is a diagram for explaining a relationship between barcode data and generated continuous data.

First, "homology" is a technique that represents a target feature by the number of holes in m dimension (m≥0). The "hole" described here is an element of a homology group, where a zero-dimensional hole is a connected component, a one-dimensional hole is a hole (tunnel), and a two-dimensional hole is a cavity. The number of holes in each of the dimensions is referred to as a Betti number. "Persistent homology" is a technique for characterizing transition of an m-dimensional hole in a target (in this example, a set of points (point cloud)), and it is possible to examine a feature related to arrangement of points using the persistent homology. In this technique, each of the points in a target is gradually expanded into a sphere, and a time point at which each of the holes is born in the process (which is represented by a radius of a sphere at the birth time) and a time point at which each of the holes dies (which is represented by a radius of a sphere at the death time) are identified.

The persistent homology will be described in detail below with reference to FIGS. 6A to 6D. As a rule, when a single sphere comes into contact with a certain sphere, centers of the two spheres are connected by a line segment, and when three spheres come into contact with one another, centers of the three spheres are connected by line segments. In this example, only connected components and holes are taken into consideration. In a case illustrated in FIG. 6A (radius r=0), only connected components are born and no hole is born. In a case illustrated in FIG. 6B (radius r=$r_1$), a hole is born and some of the connected components die. In a case illustrated in FIG. 6C (radius r=$r_2$), an increased number of holes are born, and a single connected component remains alive. In a case illustrated in FIG. 6D (radius r=$r_3$), the number of connected components remains one, and one of the holes dies. Meanwhile, each of black points illustrated in FIGS. 6A to 6D corresponds to each of interval attractors.

In a process of persistent homology calculation, the birth radius and the death radius of an element (i.e., a hole) are calculated. By using the birth radius and the death radius of the hole, it is possible to generate barcode data. The barcode data is generated for each of hole dimensions; therefore, by integrating pieces of barcode data in a plurality of hole dimensions, a single piece of barcode data is generated. The continuous data is data indicating a relationship between the radius (i.e., a time) of a sphere in the persistent homology and the Betti number.

A relationship between the barcode data and the generated continuous data will be described with reference to FIG. 7. An upper graph is a graph generated from the barcode data, in which the horizontal axis represents a radius. A lower graph is a graph generated from the continuous data (may be described as a Betti sequence), in which the vertical axis represents the Betti number and the horizontal axis represents a time. As described above, the Betti number represents the number of holes; for example, the number of existing holes is 10 when a radius corresponds to a dashed line in the upper graph, and thus the Betti number corresponding to the dashed line in the lower graph is 10. The Betti number is counted for each of blocks. Meanwhile, the lower graph is a graph of quasi time series data, and therefore, a value of the horizontal axis does not have particular meaning.

Basically, the same continuous data is obtained from the same barcode data. In other words, when original quasi attractors are the same, pieces of the same continuous data are obtained. However, in some cases, pieces of the same continuous data may be obtained from pieces of different barcode data although such a case is rare. An analogous relationship between continuous data that is generated from certain barcode data and continuous data that is generated from different barcode data is equivalent to an analogous relationship between pieces of barcode data as long as the above-described rare case does not occur. In view of the above, although the definition of a distance between pieces of data varies, an analogous relationship between pieces of continuous data that are generated from the barcode data is mostly equivalent to the analogous relationship between pieces of original continuous data.

The learning unit 23 classifies each piece of the small point process time series data according to each of events by using the feature amount of the continuous data obtained as described above. In other words, the learning unit 23 classifies each piece of the small point process time series data as an event A, or classifies each piece of the small point process time series data as an event B, for example. Then, the learning unit 23 performs learning by DL or the like so that events can be classified based on the continuous data, and stores a learning result in the learning result DB 14. The learning result may include a classification result of the continuous data (that is, output of learning by DL), or various parameters of a neural network that are used to calculate output from input. Further, the learning according to the embodiment may be supervised learning or unsupervised learning. Meanwhile, the learning is not limited to DL, but general machine learning may be adopted.

Flow of Process

Figure 8:
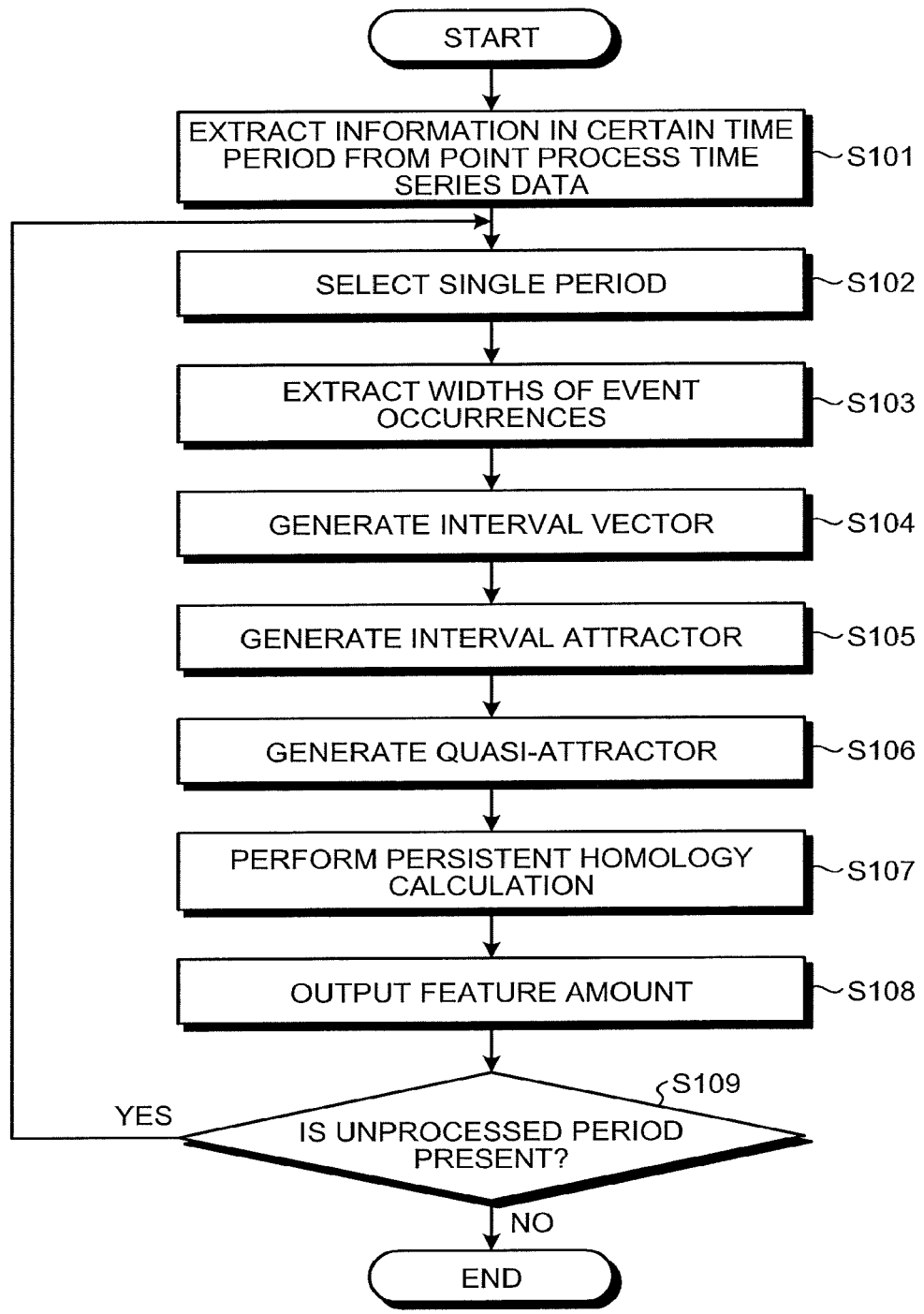
FIG. 8 is a flowchart illustrating the flow of a learning process.

Next, the learning process as described above will be explained. FIG. 8 is a flowchart illustrating the flow of the learning process. The process illustrated in FIG. 8 is performed for each piece of point process time series data. As illustrated in FIG. 8 the interval vector generating unit 21 extracts information in a certain time period from the point process time series data (S101).

Subsequently, the interval vector generating unit 21 selects a single period in order from the first period (S102), extracts widths of event occurrences (S103), and generates an interval vector in which the widths of event occurrences in the period are arranged in sequence (S104).

Then, the interval attractor generating unit 22 generates an interval attractor by adopting a certain cell width as a coordinate with respect to the vector (S105). Subsequently, the interval attractor generating unit 22 slides the coordinate of the vector and generates a quasi-attractor as a set of points (S106).

Thereafter, the learning unit 23 performs persistent homology calculation on the set of points (S107), and outputs persistent homology output as a feature amount (S108). With use of the feature amount, learning (determination of an event) is performed. Then, if an unprocessed period is present (S109: Yes), the process is repeated from S102. If an unprocessed period is not present (S109: No), the process is terminated.

Effects

As described above, the determination apparatus 10 is able to extract a rule of a change in a value that indicates a relationship between a certain interval and a next interval between a certain number of events that have occurred in the past, by using the quasi-attractor and the persistent homology. In addition, the determination apparatus 10 is able to handle chaotic data and stochastic data in the same manner because the determination apparatus 10 extracts the rule. Furthermore, the determination apparatus 10 generates a vector that represents only the sequence of event occurrences independent of an actual time axis, so that it is possible to obtain adequate information for extracting the rule of the event intervals. Moreover, the determination apparatus 10 is able to perform learning using persistent homology that can handle vectors of different sizes, so that it is not be requested to modify data.

As described above, the determination apparatus 10 assumes that the event occurrence interval follows a function of $x_{t+1} = f(x_t, x_{t-1}, \ldots )$, and extracts information on the function f. Meanwhile, the function f includes chaos (non-linear), a periodic function (linear), and random numbers (statistic). Therefore, the determination apparatus 10 performs persistent homology transform on a point sequence without taking into account values, so that it is possible to use the fact that forms of attractors are different depending on models, and it becomes possible to perform determination without any preconditions related to models. In addition, the determination apparatus 10 does not depend on models, so that it is possible to perform determination even for a point sequence that has features of a plurality of models. In other words, the determination apparatus 10 is able to perform classification with high accuracy when learning the point process time series data, even without any previous knowledge about occurrence intervals.

An experimental result of comparison between the method according to the first embodiment and a conventional method will be described below. First, an experimental condition will be described. In this example, events were caused to occur at occurrence intervals as described below, and classified by labels: "label 1: events occurred at event occurrence intervals corresponding to a normal distribution", "label 2: events occurred at event occurrence intervals corresponding to a uniform distribution (large distribution)", "label 3: events occurred such that event occurrence intervals follow Equation (1) below", and "label 4: events occurred such that event occurrence intervals follow Equation (2) below". Meanwhile, the number of pieces of data to be generated was set to the same.

$$x(i) = 3.7 \times x(i-1) \times (1 - x(i-1)) \qquad \text{Equation (1)}$$

$$x(i) = 3.9 \times x(i-1) \times (1 - x(i-1)) \qquad \text{Equation (2)}$$

Further, the following methods were used as comparison methods for comparison with the method according to the first embodiment. In a first general method, a frequency of interpolation data of event occurrence intervals (fast Fourier transform: FFT) was learned using a support vector machine (SVM), and a label was estimated using a learning result. In a second general method, learning was performed using an SVM based on a distance that was approximated by a normal distribution of data of event occurrence intervals, and a label was estimated using a learning result. In a third general method, learning was performed using an SVM based on the amount of chaotic information on data of event occurrence intervals, and a label was estimated using a learning result.

FIG. 9 is a diagram for explaining an experimental result. In this example, learning was performed by inputting the point process time series data with each of the labels, and, after the learning, when the point process time series data of the label 1 was input as an estimation target for example, and if the label 1 was estimated, it was determined that a correct answer was obtained, whereas if a different label was estimated, it was determined that a wrong answer was obtained. As illustrated in FIG. 9, the percentage of correct answers in the method according to the first embodiment was 95%, which is high accuracy, but the percentage of correct answers in the other methods remained at low accuracy.

Further, in the first general method, the percentage of correct answers for each of the labels was 25% or more or less. In the second general method, the label 1 to the label 3 were estimated with high accuracy, but the label 4 was not estimated at all. In the third general method, the label 3 and the label 4 were estimated with high accuracy, but the percentages of correct answers for the label 1 and the label 2 were low. In contrast, in the method according to the first embodiment, it was possible to obtain a percentage of correct answers for each of the labels with high accuracy.

FIG. 10 is a diagram for explaining details of the experimental result. In FIG. 10, a matrix diagram of correct answer labels and estimated labels is illustrated. For example, a percentage at which the point process time series data assigned with the label 1 was estimated as the label 1, a percentage at which the point process time series data assigned with the label 1 was estimated as the label 2, a percentage at which the point process time series data assigned with the label 1 was estimated as the label 3, and a percentage at which the point process time series data assigned with the label 1 was estimated as the label 4 are illustrated.

As illustrated in FIG. 10, it is found that all of the labels were estimated (classified) randomly in the first general method. Further, in the second general method, probability distributions, such as the label 1 and the label 2, were mostly accurately estimated, but chaotic occurrences, such as the label 3 and the label 4, were not estimated but were identified as identical. In the third general method, probability distributions, such as the label 1 and the label 2, were classified randomly among the stochastic data, but chaotic occurrences, such as the label 3 and the label 4, were mostly accurately estimated. In contrast, in the method according to the first embodiment, probability distributions, such as the label 1 and the label 2, were mostly accurately estimated, and chaotic occurrences, such as the label 3 and the label 4, were also mostly accurately estimated.

[b] Second Embodiment

While the embodiment of the present invention has been described above, the present invention may be embodied in various different forms other than the embodiment as described above.

Target

For example, the interval vector generation process and the determination process may be performed on "a plurality of events" in a certain interval, such as a time interval, that is separated under a specific condition.

Learning Method

The learning of the first embodiment is not limited to DL, but other kinds of machine learning may be adopted. Further, the number of dimensions of the interval attractor may be set arbitrarily. When a label of data serving as an estimation target is to be estimated after learning, processes, such as the interval vector, the interval attractor, and the like, are performed on data serving as the estimation target, and a processing result is input to a learning model.

Determination Method

While an example has been described in which the barcode data and the continuous data are generated with respect to each piece of small point process time series data that is generated from the point process time series data, and then an event is determined by extracting feature amounts; however, embodiments are not limited to this example. For example, it may be possible to determine an event using a single feature amount, in which each of feature amounts of the respective pieces of small point process time series data generated from the point process time series data are collected. In other words, it is possible to determine an event using a plurality of feature amounts obtained from the point process time series data.

Hardware

Figure 11:
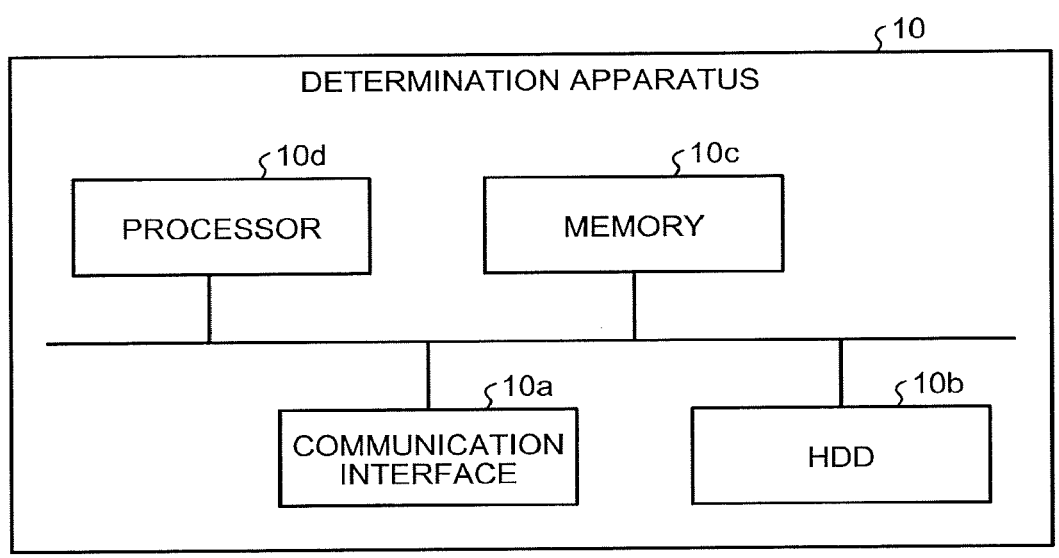
FIG. 11 is a diagram for explaining a hardware configuration example.

FIG. 11 is a diagram for explaining a hardware configuration example. As illustrated in FIG. 11, the determination apparatus 10 includes a communication interface 10a, a hard disk drive (HDD) 10b, a memory 10c, and a processor 10d. Further, the units illustrated in FIG. 11 are connected to one another via a bus or the like.

The communication interface 10a is a network interface card or the like, and communicates with other servers. The HDD 10b stores therein a program or a DB for implementing the functions illustrated in FIG. 2.

The processor 10d reads a program for executing the same process as that of each of the processing units illustrated in FIG. 2 from the HDD 10b or the like, loads the program onto the memory 10c, and operates a process for implementing each of the functions described with reference to FIG. 2 for example. In other words, the processes implement the same function as that of each of the processing units included in the determination apparatus 10. Specifically, the processor 10d reads, from the HDD 10b or the like, a program that has the same functions as those of the interval vector generating unit 21, the interval attractor generating unit 22, and the learning unit 23. Then, the processor 10d performs a process that executes the same processes as those of the interval vector generating unit 21, the interval attractor generating unit 22, and the learning unit 23.

As described above, the determination apparatus 10, by reading and executing the program, functions as an information processing apparatus that implements the determination method. Further, the determination apparatus 10 is able to cause a medium reading device to read the above-described program from a recording medium and executes the read program to thereby implement the same functions as those of the embodiment described above. The program described in the present embodiment need not always be performed by the determination apparatus 10. For example, even when a different computer or server executes the program or even when the different computer and server execute the program in cooperation with each other, it is possible to apply the present invention in the same manner.

System

The processing procedures, control procedures, specific names, and information including various kinds of data and parameters illustrated in the above-described document and drawings may be arbitrarily changed unless otherwise specified.

In addition, each component of each device illustrated in the drawings is a functional idea and thus is not always be configured physically as illustrated in the drawings. In other words, specific forms of distribution and integration of the apparatuses are not limited to those illustrated in the drawings. That is, all or part of the apparatuses may be functionally or physically distributed or integrated in arbitrary units depending on various loads or use conditions. For example, it may be possible to realize a processing unit that displays an item and a processing unit that estimates selection by separate bodies. Further, for each processing function performed by each apparatus, all or any part of the processing functions may be implemented by a CPU and a program analyzed and executed by the CPU or may be implemented as hardware by wired logic.

According to the embodiments, it is possible to perform determination without any preconditions related to models.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable recording medium having stored therein a machine learning program that causes a computer to execute a process comprising:

first generating an interval vector having a plurality of components, each of the plurality of components indicating time interval between times of adjacent two events among a plurality of events, the plurality of components being arranged in order of occurrence;

second generating a plurality of local variable points each of which includes specific components as one set of coordinates, using a predetermined number of consecutive components of the interval vector in chronological order;

third generating a Betti sequence by applying persistent homology transform to the plurality of local variable points for which interval vectors serving as starting points are different; and training a machine learning model by inputting the generated Betti sequence into the machine learning model.

2. The non-transitory computer-readable recording medium according to claim 1, wherein, the second generating includes generating each of the plurality of local variable points by extracting, in order of occurrence, a predetermined designated number of components from predetermined number of consecutive interval vectors while sliding the predetermined designated number of components one by one.

3. The non-transitory computer-readable recording medium according to claim 2, wherein, the third generating includes generating a quasi-attractor that is a set of the plurality of local variable points in a space in designated number of dimensions and generating the Betti sequence corresponding to the interval vector by applying persistent homology transform to the quasi-attractor.

4. A machine learning method comprising:

generating an interval vector having a plurality of components, each of the plurality of components indicating time interval between times of adjacent two events among a plurality of events, the plurality of components being arranged in order of occurrence, using a processor;

generating a plurality of local variable points each of which includes specific components as one set of coordinates, using a predetermined number of consecutive components of the interval vector in chronological order, using the processor;

generating a Betti sequence by applying persistent homology transform to the plurality of local variable points for which interval vectors serving as starting points are different, using the processor; and training a machine learning model by inputting the generated Betti sequence into the machine learning model, using the processor.

5. A machine learning apparatus comprising:

a processor configured to:

generate an interval vector having a plurality of components, each of the plurality of components indicating time interval between times of adjacent two events among a plurality of events, the plurality of components being arranged in order of occurrence;

generate a plurality of local variable points each of which includes specific components as one set of coordinates, using a predetermined number of consecutive components of the interval vector in chronological order;

generate a Betti sequence by applying persistent homology transform to the plurality of local variable points for which interval vectors serving as starting points are different; and training a machine learning model by inputting the generated Betti sequence into the machine learning model.

6. The non-transitory computer-readable recording medium according to claim 1, wherein, the machine learning model includes a neural network.

7. The machine learning method according to claim 4, wherein, the machine learning model includes a neural network.

* * * * *